United States Patent [19]
Bryan
[11] 3,735,057
[45] May 22, 1973

[54] COMPENSATED CROSSPOINT SWITCHING SYSTEM

[75] Inventor: Anthony G. Bryan, Tempe, Ariz.
[73] Assignee: Motorola, Inc., Franklin Park, Ill.

[22] Filed: Sept. 27, 1971
[21] Appl. No.: 184,081

[52] U.S. Cl. ....................179/186 F
[51] Int. Cl. ....................H04q 3/50
[58] Field of Search ....................179/18 GF; 317/101 CX, 235 Z, 235 Q, 235 N, 101 A; 174/DIG. 3

[56] References Cited

UNITED STATES PATENTS

| | | | |
|---|---|---|---|
| 3,542,963 | 11/1970 | Aagaard | 179/18 GF |
| 3,225,261 | 12/1965 | Wolf | 317/101 A |
| 3,456,084 | 7/1969 | Haselton | 179/18 GF |
| 3,405,224 | 10/1968 | Yawata | 317/234 N |
| 3,617,819 | 11/1971 | Boisuert | 317/234 N |

*Primary Examiner*—Kathleen H. Claffy
*Assistant Examiner*—Kenneth D. Baugh
*Attorney*—Foorman L. Mueller et al.

[57] ABSTRACT

A crossoint switching circuit in which the transmission paths through the circuit are compensated such that the resistance from any input to any output is equal to the resistance from any other input to any other output. This is accomplished by varying the resistance of the metallization in the circuit according to a prescribed method. The varying of the metallization resistance is accomplished by varying the width and length of metallization from the output or input package pins to the circuit. This width variation either adds or reduces resistance to the particular switching path indicated by the prescribed method. The prescribed method entails ascertaining that set of transmission paths having a maximum of resistance between inputs and outputs, and thereafter systematically adding resistance to other transmission paths to bring their resistances up to this maximum without adding to the maximum already established. This is accomplished by first compensating those circuit paths having resistances next highest to the ascertained maximum. Thereafter all transmission paths are compensated in descending order. If there is no possibility of raising the resistance of a particular transmission path to the ascertained maximum without raising another transmission path resistance past the ascertained maximum, then the resistance of this particular transmission path is raised to the ascertained maximum which raises certain other transmission paths past the ascertained maximum by a certain amount. This certain amount if then added to all paths not affected by the above addition, such that a minimum resistance spread is achieved between the possible paths in the switching circuit network.

13 Claims, 10 Drawing Figures

COMPENSATED CROSSPOINT SWITCHING SYSTEM

BACKGROUND OF THE INVENTION

This invention relates to integrated circuit crosspoint switching systems and more particularly to a method and apparatus for compensating the various transmission paths through the switching system by varying the width of the metallization utilized both within the various integrated circuits and the metallization used to interconnect these integrated circuits.

Crosspoint switching systems are used primarily in telephone exchanges to connect one user of the system with another user. In the past these telephone exchange switching systems have used either relays or discrete semiconductor devices such as SCR, four-layer diodes or triacs to connect a particular input line with a particular output line in the exchange. One such system is shown in the U.S. Pat. to E. F. Haselton, Jr., No. 3,456,084 issued July 15, 1969. In the normal telephone exchange, even for a small town, the numbers are such that relays or diodes which perform the crosspoint switching are in the millions. The problem with either relays or discrete semiconductor devices is primarily that they are large, expensive, consume a great deal of power, and are wanting in long-term reliability. In addition the weight of these exchanges due to the weight of the switching elements and the power supplies required, make portable telephone exchanges extremely heavy and bulky. This precludes, for the most part, their use in the field such as for military applications or in emergency telephone communication nets where the equipment must be backpacked into a given area.

The use of integrated circuits to perform crosspoint switching functions while reducing the size of the networks by an order of magnitude, while being significantly less expensive, while drawing almost an order of magnitude of less power, and while being (approximately)many times as reliable as the aforementioned systems, suffer universally from a common problem. This problem centers around the type of metallization utilized to interconnect integrated circuits. The metallization utilized in general to connect integrated circuits has a thickness on the order of 10,000 to 20,000 angstroms. The thinness of this metallization is necessary for pattern definition compatible with the microscopic integrated circuits. Metallization of this thickness has however associated with it a considerable amount of resistance. It is a requirement of telephone exchange type switching networks that the input-output resistance for a given transmission path through the switching circuit be the same for any of the possible paths through this switching circuit. The reason for this requirement is obvious in that the amplitude of the communication from one user to another must be equalized for all of the various users. If the transmission paths through the switching network present different resistances therethrough, the amplitude of the signals will vary for any given path through the switching circuit. Because each one of the crosspoint switching circuits is cascaded with other crosspoint switching circuits such that perhaps 20 switching circuits are necessary to connect one user with another user in a moderately complex system, resistance variation of the paths must be minimized. This resistance variation is referred to herein as the resistance spread of the network.

Resistance spread is not a problem when individual relays or discrete devices are used because they are connected with wires of substantial thickness. By substantial thickness is meant wires having diameters of at least 1 millimeter. This corresponds to a thickness of ten million angstroms. On the other hand metallization for integrated circuits is on the order of 10,000 to 30,000 angstroms which is clearly three orders of magnitudes thinner than the wires normally used.

In conventional integrated circuits, assuming for instance metallization of 12,000 angstoms, in a 4 × 4 crosspoint switching system in which four users are connected with four other users, one can expect a resistance spread due to the metallization alone (if the system is uncompensated) of approximately 2 to 4 ohms. Ordinarily in integrated circuits if the circuit is drawing for instance 10 milliamperes, a drop of the supply voltage through this type circuit would only be on the order of 10 millivolts per ohm of path resistance in the supply line. This is no problem in the standard integrated circuit. However, here a drop of 10 millivolts per ohm of resistance across the switching system network for each crosspoint switching system is critical. Unfortunately the metallization cannot be thickened significantly while still maintaining the small size of the crosspoint switching circuit. The reason that the metal cannot be made thicker is that shorts occur when the metallization is built up. Nor can the type of metal utilized for the standard integrated circuit metallization significantly lower the resistance of such thin metal sheets or films. The best type of metallization for the integrated circuits to be described hereinafter is the so-called beam-lead metallization in which 1,000 angstroms of titanium is followed by 1,500 angstroms of platinum which in turn is followed by 20,000 angstroms of gold. This type metallization system when uncompensated in the above mentioned 4 × 4 array has a resistance spread of between 2 and 4 ohms. The normal requirements for such a 4 × 4 array require that the input-output resistance variation, i.e., the resistance spread, be less than 3 ohms. In addition to the metallization however there are two other components of the system which contribute significantly to the resistance spread. The first of these is the crossunder regions necessary in order to interconnect various elements of the array. Crossunder tolerances are not constant and an individual crossunder may vary between 1 and 2 ohms for each crossunder. In a normal 4 × 4 array one can expect approximately a 3-ohm spread due to the crossunders utilized. In addition if silicon controlled rectifiers are used, the silicon controlled rectifiers (SCRs) have resistance characteristics therethrough which are not constant. In general the resistance spread through the SCR is approximately 3 ohms. Thus a total maximum resistance spread of 4 + 3 + 3 or 10 ohms is encountered when fabricating integrated circuit 4 × 4 matrixes.

The subject circuit eliminates crossunders and reduces resistance spread due to the metallization of the network to zero thus leaving the SCRs as the only resistance spread elements. Silicon controlled rectifiers are presently being made such that the variation in resistance between silicon controlled rectifiers is kept below the 3-ohm requirement.

The crosspoint switching system to be described herein is built up of switching building blocks called chips. In the 4 × 4 array to be described, each chip contains four SCRs. In the final embodiment the crosspoint switching system is a two-wire system in which a pair of wires from one user is connected to a pair of wires for another user. However for simplicity, a single-wire crosspoint switching system will be described, it being understood that the single-wire switching system is merely duplicated if a two-wire crosspoint switching system is desired. In a single-wire 4 × 4 matrixed array each chip contains two SCRs. A total of eight chips are utilized in order to obtain the 4 × 4 network. In a two-wire crosspoint switching system each chip contains four SCRs while in the single-wire system each chip contains two SCRs. The first problem therefore to be overcome is to make sure that the resistance through the various transmission paths through the chip are equal.

Taking for instance the single-wire case each chip, as mentioned before, has two SCRs. In this case each chip has a single input which is switched by one or the other of the SCRs to one of two outputs. Simply stated, the transmission path from the input to one of the outputs through one of the SCRs must have the same resistance as a transmission path from this same input through the other of the SCRs to the other of the outputs. This is accomplished by altering the internal metallizations of the chip by lengthening or shortening, widening or narrowing certain of the chip metallizations so that the path resistances of the two paths through the chip are equal, it being understood that metallization having larger widths have correspondingly lower resistances.

The second step providing the crosspoint switching system with a zero resistance spread comes in the interconnection of the various chips. Once each chip has been "compensated" such that all the transmission paths through it present equal resistances, then it becomes necessary that all the paths between and including these chips also be compensated, it being appreciated that the chips are also interconnected with the aforementioned thin metallization.

The use of contact metallization as a compensating means rather than discrete resistors results in compensation no matter what the metallization thickness is. Once having computed the resistances that are to be added or subtracted from the switching network and having decided on metallization geometries which will give these resistances assuming a given thickness of the metallization, then no matter what the final thickness of the metallization turns out to be, the system will be compensated. An example is illustrative. If for instance a metallization which is actually put down is twice the thickness assumed in the compensation calculations, it will be appreciated that the resistance of this metallization is one-half that which was calculated. However the resistances inserted by the patterned metallization are also one-half such that once having figured out the relative metallization geometries which must be added to the system, the thickness of the metallization actually becomes irrelevant.

It will be appreciated from the aforementioned discussion that there are two types of metallization involved. The first is chip metallization and the second is interconnection metallization which interconnection metallization is deposited on top of a ceramic carrier. Even assuming that the chips are uncompensated, the chips themselves are a very small size. Thus the amount of total resistance added to the system by the metallization in the chips themselves can be considered minimal. If then the interconnection metallization, i.e., that large amount of metallization which is on the ceramic carrier, is patterned so as to compensate for its contribution to the resistance spread, then the resistance spread of the entire network is considerably reduced. For instance, if the resistance spread of an uncompensated 4 × 4 network due to the metallization alone is 3 to 4 ohms, then approximately 30 percent of this uncompensated resistance spread is due to the metallization in the chip while the remainder is due to the interconnect metallization on the surface of the ceramic carrier. It can therefore be seen that by compensating only the interconnect metallization, a significant improvement is achieved. It should be remembered however that unless the resistance spread due to the metallization can be reduced to zero, the entire crosspoint switching circuit will exceed the 3-ohm limitation due to the resistance spread of the SCRs utilized. It is therefore necessary to compensate crosspoint switching circuits both as to the metallization on the chip and also as to the interconnect metallization on the ceramic carrier.

The method used in compensating the chip is much the same as that used in compensating the interconnected chips as a whole. To reiterate, in order to compensate the chip, all the distances of the paths through the chip are defined. Assuming that the metallization is of uniform width in the chip, then the SCR closest to the input for the chip must have a longer metallization strip thereto in order to compensate for the additional resistance of the metal necessary to connect to the SCR which is furthest from the input node. Alternatively the metallization from the input node to the furthest SCR can be made wider thus decreasing the resistance between the input node and the furthest SCR to match that between the nearest SCR and the input. Likewise the output of the furthest SCR has metallization to the output node of increased width so as to even further decrease the resistance from the input to the output node of the furthest SCR such that it matches the resistance from the input node to the output node of the nearest SCR. In addition there must be a metallization strip from the input node across the chip and terminating at a further contact pad. This provides that the input signal delivered to the input node is carried across the chip and is made available at an opposing side thereof. The resistance between the input node and the opposing side contact must be accurately defined so it can be taken into account in the interconnection of the chips. What is accomplished is the provision of equal resistance transmission paths through the chip. Each of the chips then can be treated therefore as a compensated block of the system.

After having compensated each of the chips, the chips are arrayed in such a manner that an M × N matrix is formed. The chips are spaced from each other a predetermined distance and each chip is identical in size to all the other chips. The various transmission paths are then listed with each transmission path accompanied by the distance that the input signal must travel between each input and a given output of the network. Each chip however has a defined transfer function such that the resistance differences in the paths through the array will be readily calculatable in terms of the distance that a given input signal must travel until it reaches a designated output node of the network. In a 4 × 4 array having four inputs and four possible outputs for the network there are 16 possible paths through the network itself. It will be appreciated that signals through various groups of paths will travel the same distance and are therefore attenuated by the circuit a given amount. It is the purpose of the second compensation technique to compensate for the differences in path lengths between these groups. This is accomplished by ascertaining which group of paths has the maximum length and therefore the maximum resistance. Then the group of paths having the next highest length or next highest resistance has added thereto an amount of resistance which will bring up the resistance of these paths to those having the highest resistance. These groups of resistance paths are then compensated in descending order in such a manner that no added resistance ever takes any one of the resistance paths above this maximum. At least one example of such a system shows that it is possible to add resistance to various of the transmission paths in such a manner that after final compensation, each of the transmission paths has equal resistance therethrough. It will be appreciated that the absolute value of the resistance of the paths is not a critical factor. It is only the variation in resistance between the paths which presents a critical problem in crosspoint switching networks. Thus by reducing the variation in resistance between any path and any other path through the switching circuit, network resistance variation will only be dependent upon the variation in the individual SCRs themselves and not dependent on the metallization or the particular path which is indicated at one given instant of time.

The subject method also has application in minimizing the resistance spread due to the metallization insofar as it is not possible with given pin configurations or geometric configurations to provide that the resistance spread be reduced exactly to zero. The subject technique however is applicable to all M × N matrixed arrays and can reduce the resistance spread over uncompensated similar circuits by at least an order of magnitude.

It is therefore the initial compensation of subunits (chips) in the network followed by the compensation of the interconnection of these subunits by specific metallization geometries which reduces resistance spread of the network. It will be appreciated that in the subject configuration no crossunder circuits are necessary in the interconnection of the M × N network such that resistance spreads due to variability in crossunders is eliminated from consideration.

SUMMARY OF THE INVENTION

It is therefore an object of this invention to provide an improved crosspoint switching circuit in which the switching paths through the circuit have equal resistances.

It is another object of this invention to provide a crosspoint switching circuit including individual integrated circuit chips having switching elements therein which chips are arrayed and interconnected by metallization which is patterned so as to equalize the resistance of the transmission paths through the network, by varying the size and the length of the interconnecting metallization.

It is a still further object of this invention to provide integrated circuit chips containing switching elements in which the switching paths through the chip have equal resistances such that whenever the chip is utilized in an M × N switching matrix all output points of the matrix are at equal voltage drops from any input point of the matrix.

It is a still further object of this invention to provide a method of compensatng an M × N matrixed array crosspoint switching circuit by utilizing the metallization both in the integrated circuit chips making up the switching elements of the array and the interconnect metallization connecting up these chips so as to reduce the resistance spread of the network by eliminating that portion of the resistance spread due to the metallization.

Other objects and features of this invention will become more fully apparent upon reading the following description taken in connection with the accompanying drawings.

BRIEF DESCRIPTION OF THE INVENTION

Figure 1:
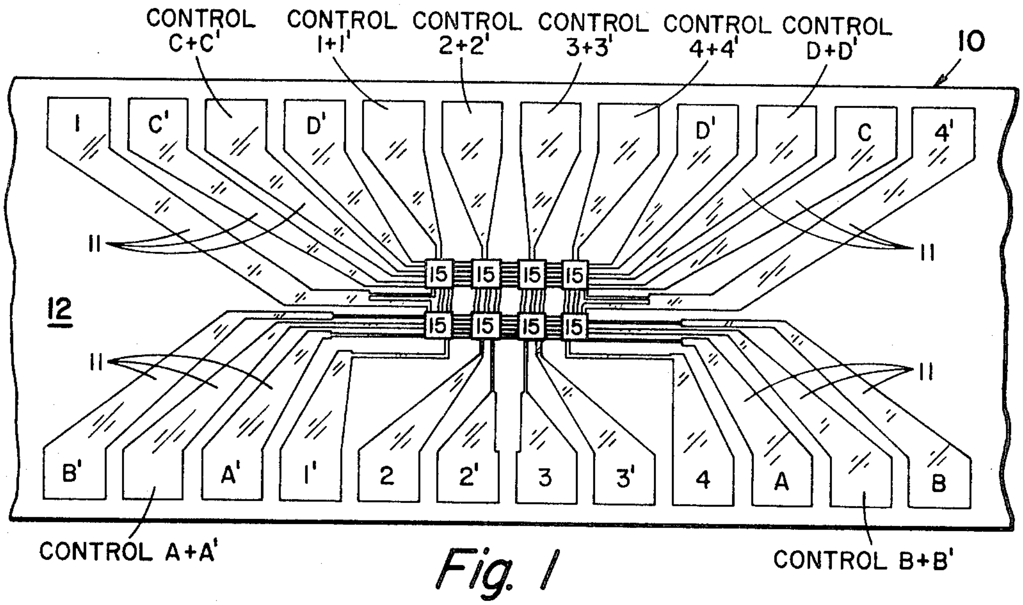
FIG. 1 is a top view of a 4 × 4 two-wire crosspoint switching circuit indicating the patterning of the interconnect metallization and the position of the integrated circuit chip switching elements.

There is described a crosspoint switching circuit in which the transmission paths through the circuit are compensated such that the resistance from any input to any output is equal to the resistance from any other input to any other output. This is accomplished by varying the resistance of the metallization in the circuit according to a prescribed method. The varying of the metallization resistance is accomplished by varying the width and length of metallization from the output or input package pins to the circuit. This width variation either adds or reduces resistance to the particular switching path indicated by the prescribed method. The prescribed method entails ascertaining that set of transmission paths having a maximum of resistance between inputs and outputs, and thereafter systemmatically adding resistance to other transmission paths to bring their resistances up to this maximum without adding to the maximum already established. This is accomplished by first compensating those circuit paths having resistances next highest to the ascertained maximum. Thereafter all transmission paths are compensated in descending order. If there is no possibility of raising the resistance of a particular transmission path to the ascertained maximum without raising another transmission path resistance past the ascertained maximum, then the resistance of this particular transmission path is raised to the ascertained maximum which raises certain other transmission paths past the ascertained maximum by a certain amount. This certain amount is then added to all paths not affected by the above addition, such that a minimum resistance spread is achieved between the possible paths in the switching circuit network.

DETAILED DESCRIPTION OF THE INVENTION

As mentioned before in many switching applications, such as in a telephone central office switching network, a transmission path is provided between given input and output lines by selectively establishing crosspoint connections in the switching network. Such a switching network typically includes a plurality of switching matrixes between groups of input and output lines, each stage containing one or more switching matrixes. In some switching networks the matrixes are interconnected to plurality of paths between each line in the input line group and each line in the output line group, while other switching networks provide a unique path between any given line in the input line group and any given line in the output line group.

Switching networks are known which employ various types of semiconductor devices of circuits as crosspoint elements. For example, U.S. Pat. No. 3,456,084 issued to E. F. Haselton, Jr., on July 15, 1969, discloses a system utilizing silicon controlled rectifiers to provide the crosspoint connection. The operation of the silicon controlled rectifier is fully explained in the above patent and is characterized by a latching function which provides that once the energizing pulses to a given silicon controlled rectifier are applied, no other pulses need be applied other than to turn off the SCR. This provides the crosspoint switching circuit with a memory and reduces the power consumption of the circuit.

However such a silicon controlled rectifier circuit is not easily fabricated in integrated circuit form because of the aforementioned metallization problem and because of the crossunders thought to be necessary in connecting up such a switching circuit. It will be appreciated that the switching circuit shown in the Haselton patent is uncompensated in that there is no provision for transmission path resistance differences. In general with discrete silicon controlled rectifiers, because of the relatively thick interconnect wires employed, interconnect metallization does not present a problem. Neither do crossunders since they are not utilized in discrete circuits. However it will be appreciated that discrete circuits are at least two orders of magnitude larger in size than the integrated circuit switching network now to be described.

Referring to FIG. 1, a top view of the subject 4 × 4 two-wire integrated circuit switching network is shown by the reference character 10. What can be seen from this figure is that metallization strips 11 are disposed over a carrier which in this case is a ceramic wafer 12. Also mounted on the ceramic wafer are integrated circuit chips 15 shown connected to strips 11 and interconnected in a predetermined manner. It will be immediately apparent from visual inspection of FIG. 1 that the patterned metallization strips 11 do not have symmetrical configurations and have end portions of various geometric configurations. The metallization strips 11 comprise the interconnect metallization referred to hereinbefore. The switching network shown pictured in FIG. 1 is not an idealized network but is rather one which as realized operates so as to minimize the resistance spread due to metallizations. It will be remembered that the metallizations referred to herein include both the metallization strips 11 which form the interconnect metallization and the metallization in the chips 15 themselves. Each of the contact pads lying along the upper and lower border of the package defined in FIG. 1 are labelled with respective input lines and output lines as shown. This is a 4 × 4 two-wire switching network such that, for instance, the two input lines 1 and 1' may be connected by this network to any one of the four paired outputs A-A', B-B', C-C' or D-D'. Likewise the paired inputs 2-2' can be connected to any of these output pairs. In the same manner the inputs 3-3' and the inputs 4-4' can be so connected. The connections are made by the circuitry in the chips 15 which circuitry is controlled by pulses applied to the control terminals shown in FIG. 1. In order to connect the paired input 1-1' to, for instance, the paired output C-C', appropriate signals must be delivered to both the 1-1' control contact as well as the C-C' control contact. The nomanclature used in FIG. 1 will become more clear in connection with the logic or truth tables associated with the various switching circuits. It is only important at this juncture to understand that what is shown in FIG. 1 is that various input and output connections to the chips 15 may be provided with a variety of different resistances depending on the width and length of the connecting metallizations thereto. For instance it will be appreciated that the contact corresponding to input 4 has a very long, narrow extension which provides a relatively high resistance between the contact pad 4 and the lower right chip 15. It should be noted also at this time that the contact pad corresponding to input 2 has an extension of one width while the contact pad corresponding to the input 3' although having a somewhat similarly configured contact pad has an extension portion of about twice the width of that associated with contact pad 2.

Figure 2:
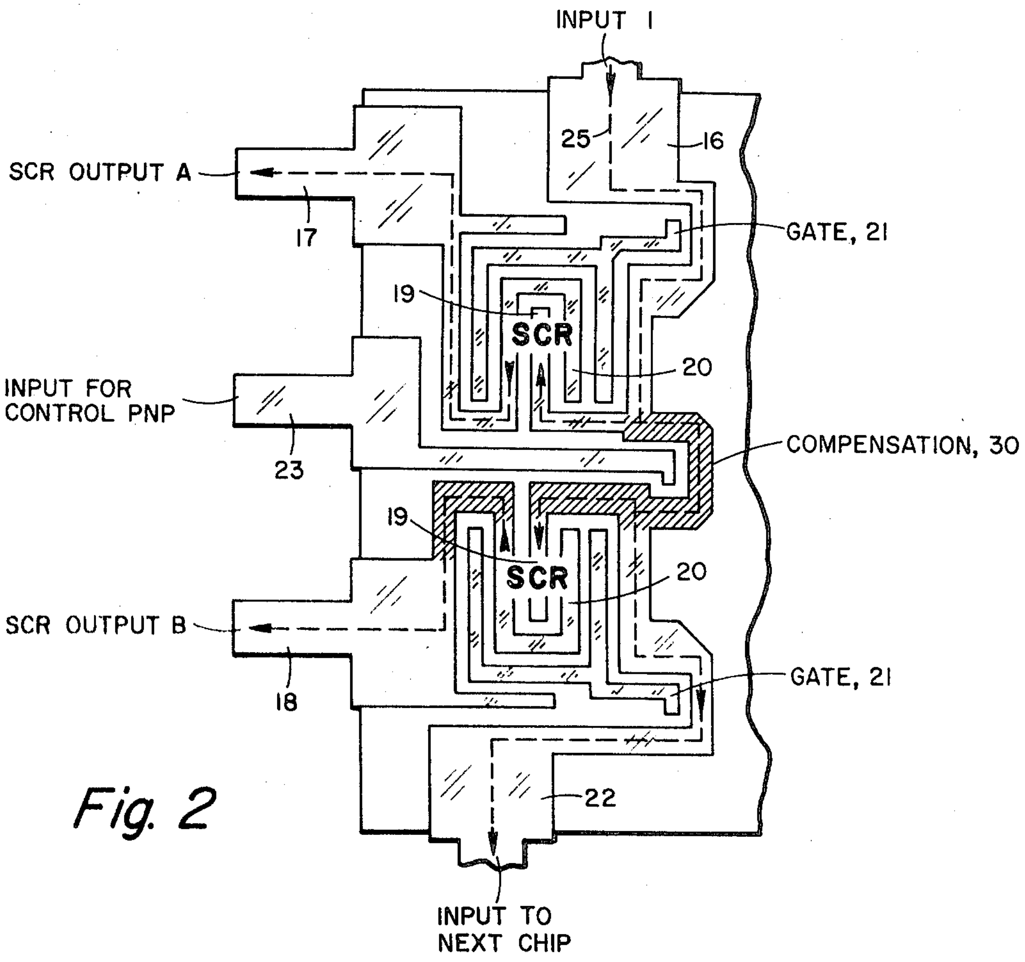
FIG. 2 is a top view of a portion of one of the integrated circuit chips shown in FIG. 1 showing the interconnect metallization between an input node and two output nodes through two silicon controlled rectifiers.

While the metallization shown in FIG. 1 compensates the switching circuit for the interconnect metallization, the metallization shown in FIG. 2 compensates each individual chip 15. What is shown in FIG. 2 is one portion of one chip 15. This portion contains two SCRs, and input pad 16 labelled "Input 1," and two output pads 17 and 18 labelled respectively "SCR Output A" and "SCR Output B." The regions for the two SCRs are in general delineated by the rectilinear structures overlaid with the designation "SCR." Each SCR has an anode 19, a cathode 20 and a gate 21. The portion of the chip shown also includes a contact 22 which serves as the input to the next chip. Also shown is an input, 23, for a control PNP transistor (not shown in this figure) which renders the top-most SCR conductive. The bottom-most SCR is rendered conductive by another PNP transistor (not shown in FIG. 2) which is controlled from another contact (not shown).

The transmission path for an input signal at Input 1 is shown by the dotted line 25. Any input signal at Input 1 follows the dotted line 25 through the metallization as shown. From the prior discussion, it will be apparent that the top-most SCR is closer to Input 1 than the bottom-most SCR. It will further be appreciated that the transmission path from Input 1 to the bottommost SCR is longer than the input path from Input 1 to the top-most SCR. Assuming metallization of constant width and constant thickness, it will be obvious that the resistance of the path between the input and the bottom-most SCR is greater than the resistance between Input 1 and the top-most SCR. Tracing the signal through each of the SCRs it will also be apprent that the signal paths from Input 1 to the Output A would under normal uncompensated circumstances be less than the resistance between the Input 1 and the Output B due solely to the difference in path length. What can be readily seen in FIG. 2 by the compensation shown in cross-hatched portion 30 of FIG. 2 is that the metallization in the chip 15 has been broadened so as to reduce the resistance in the path between Input 1 and Output B. The width of the shaded area is controlled such that the resistance between Input 1 and Output B is the same as the resistance between Input 1 and Output A. This in general is what is meant by compensating the chip. As mentioned before, compensating the chip makes calculation of the compensation for the whole switching network a much simpler matter than if the chips themselves were not internally compensated in the aforementioned manner.

FIGS. 1 and 2 are included in the first portion of the detailed description to broadly indicate the manner in which the subject switching network is compensated. A basic understanding of crosspoint switching is however necessary in order to understand the method by which, for instance, the various resistance values which must be added to or subtracted from the network is arrived at.

Figure 3:
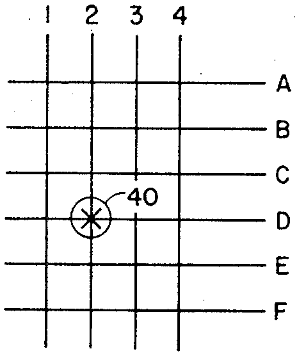
FIG. 3 is a diagram schematically showing generically a crosspoint switching system.
Figure 4:
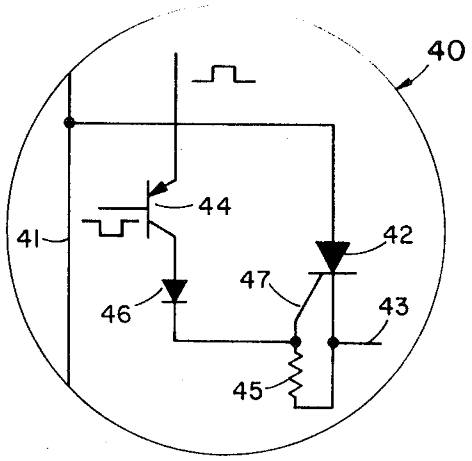
FIG. 4 indicates one method of connecting wires at a crosspoint utilizing silicon controlled rectifier latching elements in which the array is activated by a ½-write system.

Referring now to FIG. 3, it will be apparent that a matrix has been formed of a single-wire variety including vertical input columns labelled 1 – 4, across which are formed horizontal output rows labelled A – F. In crosspoint switching, points of crossover of the columns and rows provide a connection between a given column and a given row such as might be expected by pressing down at the point X such that if the horizontal row D is wire and the vertical column 2 is also wire, contact will be made between two wires at that point so as to provide a connection or transmission path between Input 2 and Output D. By pressing down at any one of the crossover points therefor, any input can be connected to any output. This is called crosspoint switching. The type of switching network which most conveniently connects input columns to output rows is shown encircled by the circle 40 in FIG. 4. Here an input column shown by the line 41 is connected to the anode of a silicon controlled rectifier 42 whose cathode is connected to an output row 43. The state of the SCR 42 is controlled by a PNP transistor 44 with its collector coupled through a diode 46 to the gate 47 of the SCR 42. A gate resistor 45 is provided between the gate and cathode of the SCR. The particular SCR is triggered into conduction by the application of two signals at the PNP transistor 44. The first of these signals is a positive current applied to the emitter of the transistor 44. The second of these signals is a negative going voltage applied to the base of the transistor 44. When these two signals are applied simultaneously across the transistor 44, current flows therethrough and to the gate 47 of the SCR 42 turning the silicon controlled rectifier on. This connects the input column 41 to the output row 43. A more detailed description of the latching characteristics in the latent memory of an SCR crosspoint system is outlined in the aforementioned patent to Haselton.

Figure 5:
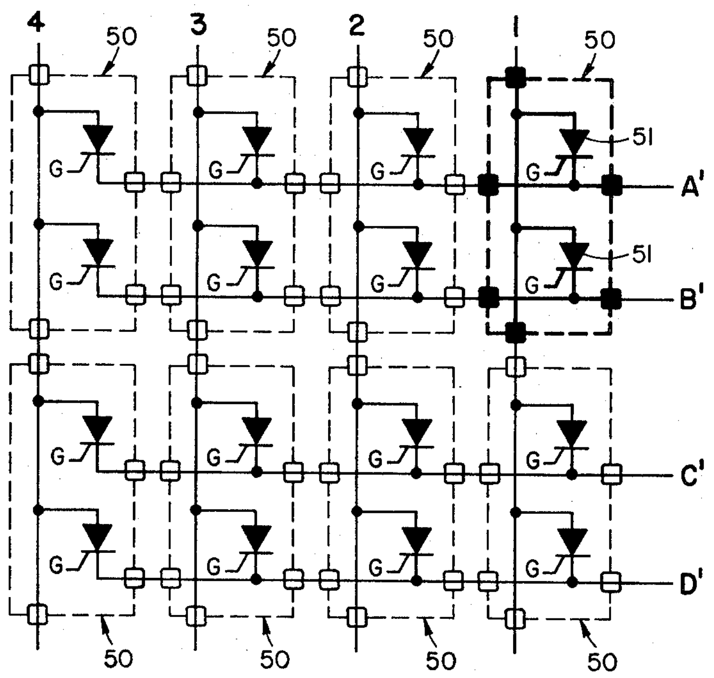
FIG. 5 is a 4 × 4 single-wire crosspoint switching circuit indicating the use of eight chips, each chip containing two SCRs and two outputs.

While the following description will be based on one and two-wire 4 × 4 switching networks, the concepts involved, as far as compensation is concerned, are applicable to any M × N matrix if the M × N matrix is composed of subunits which are arrayed or interconnected with compensated metallization. Referring to FIG. 5, a single-wire 4 × 4 switching network is shown with the input columns labelled 1, 2, 3 and 4, and the output rows labelled A′, B′, C′ and D′. As can be seen the array is made up of eight subunits shown by the dotted lines 50. Each of these subunits are referred to herein as chips. In a single-wire crosspoint switching network such as that shown in FIG. 5, each of the subunits 50 has associated with it two SCRs 51 connected as shown. It will be appreciated that a row consists of the interconnected cathodes of four of these SCRs while an input column is composed of interconnected anodes of four SCRs. From inspection of FIG. 5 it will be appreciated that if a transmission path is to be provided between Input 4 and Output A′, the signal must travel through the upper left-most SCR and through the row designated by the character A′. In so doing the transmission path must pass over the 3 column, the 2 column and the 1 column without making contact thereto. This would seemingly indicate that for this transmission path at least three cross-under regions would be necessary. However a metallization system is shown in which crossunders are eliminated. Moreover the schematic diagram of the circuit still remains that shown in FIG. 5. Thus in FIG. 5 is shown a 4 × 4 single-wire network which is made up of eight so-called subunits or chips. If more rows or columns are desired, more subunits are added along a row or column so as to provide for the necessary switching capacity. Thus when the subject circuit is described in terms of a 4 × 4 matrix, it will be appreciated that path lengths can be computed for either expanded or contracted matrixes so as to provide for the necessary compensation.

Figure 6:
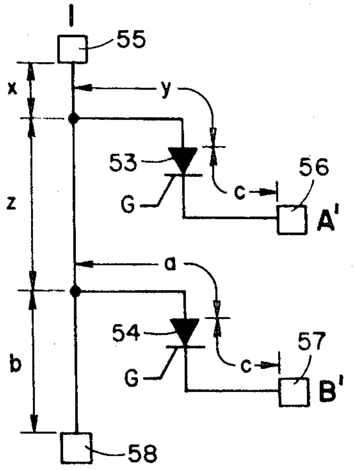
FIG. 6 is a diagrammatic representtion of the circuitry in one of the chips of FIG. 5 indicating metallization distances which are to be equalized.

Initially each chip 15 is laid out so that from an input anode to any output cathode the transmission path has the same resistance regardless of which of two of the SCRs are turned on. A subunit or chip is diagrammatically shown in FIG. 6 to be composed of two SCRs 53 and 54. The input pad to this chip is labelled by the reference character 55. The output pads are labelled 56 and 57. The interconnect pad to the next adjacent chip is labelled 58. The nomanclature used hereinafter corresponds to the following truth or logic tables for the particular transmission paths such that the inputs in the single-wire case are 1, 2, 3 and 4, and the outputs are A′, B′, C′ and D′. The relative path lengths are as shown in FIG. 6 between the input pad 55 and the pads 56, 57 and 58.

Assuming that each SCR plus cathode lead has a resistance of $c$ ohms, the various path resistances to the chip are shown in the following table.

TABLE I

| Path | Resistance |
|---|---|
| Input 1 to Output A′ | x+y+c ohms |
| Input 1 to Output B′ | x+z+a+c ohms |

(where $x$, $y$, $c$, $a$, $z$, and $b$ are the resistances in ohms shown in FIG. 6)

Now when the chip is laid out, the distance corresponding to a resistance $y$ is made equal to the distance corresponding to resistance $z+a$ by appropriate metal width techniques. Thus the transmission path between Input 1 and Output B′ becomes $x+y+c$ ohms. It is therefore possible to match these two transmission paths through the chip. It will be further appreciated that the resistance between pad 55 and the pad 58 is given by $x+z+b$ ohms. If eight of these subunits or chips 50 are used to form a 4 × 4 crosspoint array, they are placed in two rows of four chips with the anodes being common vertically and the cathodes being common horizontally as shown in both FIGS. 5 and 7. It will be appreciated that if two chips are connected by firing appropriate SCRs such that the two chips are in series, then the resistance through the second chip will be $x+y+c$ while an additional resistance $x+z+b$ must be added for going across the first chip plus, of course, any resistance in the interconnect metallization.

Figure 7:
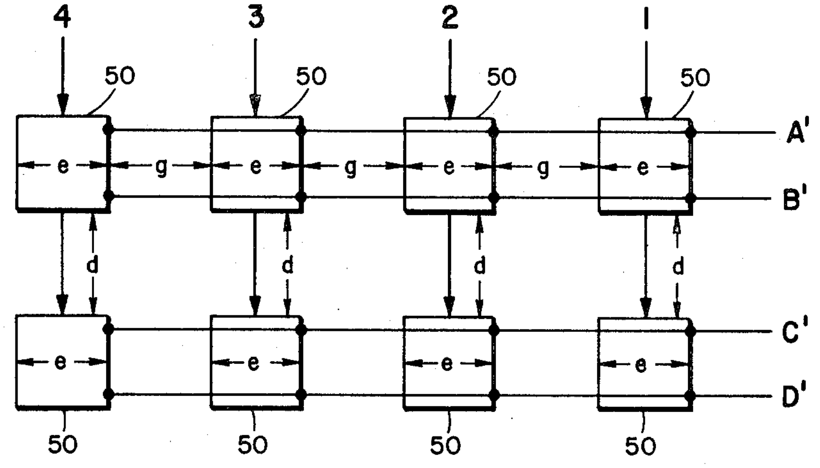
FIG. 7 is a diagrammatic representation of a single-wire 4 × 4 network indicating the interchip spacings.

When the chips or subunits 50 are arrayed as shown in FIG. 7, it will be appreciated that the path across each chip in a horizontal direction is designated by a resistance $e$. $d$ and $g$ are the resistances of the metallization joining the individual chips; $e$ being the horizontal metallization resistance beneath each chip. Now by way of example for a typical crosspoint array, certain identities of resistances can be made by appropriate patterning of the metallization and location and spacing of the chips. Although the following identities give certain relationships amongst the resistances, these are by no means the only relationships that can exist. It is only important in order to solve or simplify the following equations that some relationship be assigned between the resistances shown. In this example which conveniently turns out to give a zero resistance spread for the network, the resistance $g$ is made approximately equal to $d$. This can be done quite conveniently by making the leads between the chips the same length. $e$ is made to be approximately equal to $2d$ although it will be appreciated that e could be any multiple of $d$. $e$ is also made equal to the resistance across the individual chip such that $e$ is equal to $x+z+b$. $b$ is made equal to $x$ and $z$ is assigned a value $x/2$. This by simplification gives a resistance to the array as shown in Table II with a minimum resistance for any path equalling $x+y+c$ ohms and the maximum resistance equal to $x+y+c+60x/4$ ohms. The various paths for the single-wire array shown in FIG. 7 are now listed in Table II.

TABLE II

| Path | Resistance | Resistance with: g=d, e=2d, e=x+z+b, b=x and z=x/2 |
|---|---|---|
| 1-A′ | x+y+c | x+y+c |
| 1-B′ | x+y+c | x+y+c |
| 1-C′ | x+y+c+x+z+b+d | x+y+c + 15x/4 |
| 1-D′ | x+y+c+x+z+b+d | x+y+c + 15x/4 |
| 2-A′ | x+y+c+g+e | x+y+c + 45x/4 |
| 2-B′ | x+y+c+g+e | x+y+c + 45x/4 |
| 2-C′ | x+z+b+d+x+y+c+g+e | x+y+c + 60x/4 |
| 2-D′ | x+z+b+d+x+y+c+g+e | x+y+c + 60x/4 |
| 3-A′ | x+y+c+2g+2e | x+y+c + 30x/4 |
| 3-B′ | x+y+c+2g+2e | x+y+c + 30x/4 |
| 3-C′ | x+z+b+d+x+y+c+2g+2e | x+y+c + 45x/4 |
| 3-D′ | x+z+b+d+x+y+c+2g+2e | x+y+c + 45x/4 |
| 4-A′ | x+y+c+3g+3e | x+y+c + 45x/4 |
| 4-B′ | x+y+c+3g+3e | x+y+c + 45x/4 |
| 4-C′ | x+z+b+d+x+y+c+3g+3e | x+y+c + 60x/4 |
| 4-D′ | x+z+b+d+x+y+c+3g+3e | x+y+c + 60x/4 |

The path resistances listed above can now be featured in matrix form and simplified by dividing the resistances additional to $x+y+c$ by $x/4$. Thus a resistance unit of $x/4$ is formed.

TABLE III

| | 4 | 3 | 2 | 1 |
|---|---|---|---|---|
| A′ | 45 | 30 | 15 | 0 |
| B′ | 45 | 30 | 15 | 0 |
| C′ | 60 | 45 | 30 | 15 |
| D′ | 60 | 45 | 30 | 15 |

In order to equalize the path resistances which vary from 0 to 60, units of resistance must be added to certain paths to bring them up to the maximum path resistance of 60 units without raising any other path above 60. This is done by "compensating" the paths in descending order. What is done is to add resistance to the paths having the next highest resistance. In this case this would mean raising 45 to 60 by adding 15 resistance units. The 45 resistance unit paths occur in input columns 3 and 4. It will be seen that adding 15 units to column 4 by adding 15 units of input resistance to the input to column 4 will raise path 4-C′ and path 4-D′ over 60. So 4-A′ and 4-B′ will have to be compensated later by adding resistance to the row outputs. Therefore 15 resistance units are added to the input to column 3. This yields:

TABLE IV

| | 4 | 3 | 2 | 1 |
|---|---|---|---|---|
| A′ | 45 | 45 | 15 | 0 |
| B′ | 45 | 45 | 15 | 0 |
| C′ | 60 | 60 | 30 | 15 |
| D′ | 60 | 60 | 30 | 15 |

Now it can be seen that paths 4-A′, 4-B′, 3-A′ and 3-B′ still are not up to 60 resistance units. These are now compensated by adding 15 resistance units to the Outputs A′ and B′. The matrix thus becomes:

TABLE V

| | 4 | 3 | 2 | 1 |
|---|---|---|---|---|
| A′ | 60 | 60 | 30 | 15 |
| B′ | 60 | 60 | 30 | 15 |
| C′ | 60 | 60 | 30 | 15 |
| D′ | 60 | 60 | 30 | 15 |

It will be appreciated that by adding these resistances, no path has been taken above 60 resistance units. It can now be seen that by adding 30 resistance units to input column 2 and 45 resistance units to input column 1, all possible transmission paths through the switching circuit have 60 resistance units such that the matrix becomes:

TABLE VI

| | 4 | 3 | 2 | 1 |
|---|---|---|---|---|
| A′ | 60 | 60 | 60 | 60 |
| B′ | 60 | 60 | 60 | 60 |
| C′ | 60 | 60 | 60 | 60 |
| D′ | 60 | 60 | 60 | 60 |

Figure 8:
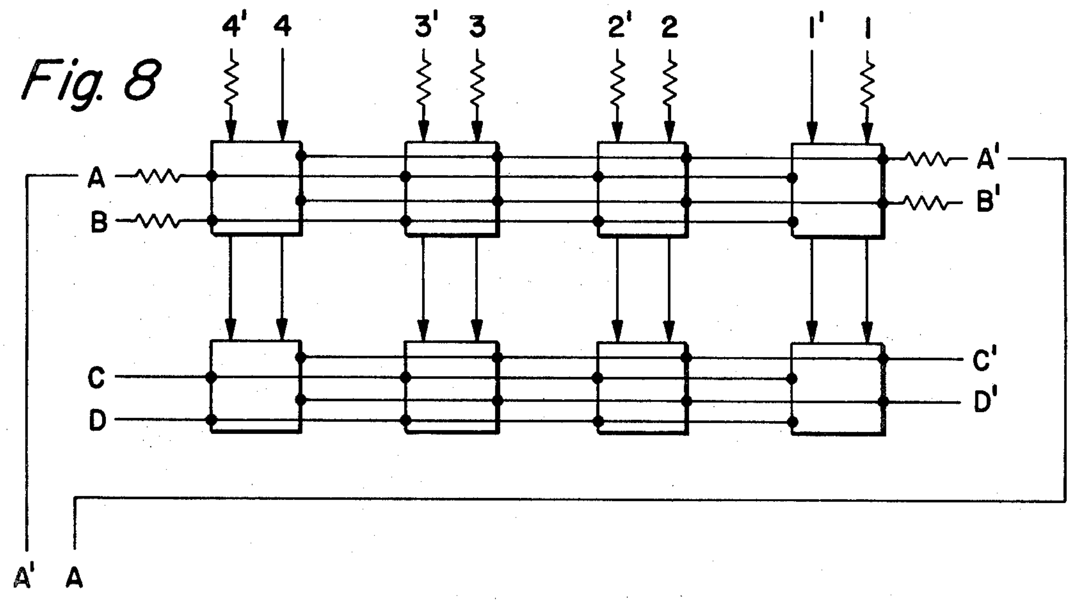
FIG. 8 is a two-wire 4 × 4 network corresponding to the one-wire network in FIG. 7.

For a two-wire system such as that shown in FIG. 8 the compensation is the mirror of that for the single-wire system. Thus:

TABLE VII

| | 1' | 2' | 3' | 4' |
|---|---|---|---|---|
| A | 45 | 30 | 15 | 0 |
| B | 45 | 30 | 15 | 0 |
| C | 60 | 45 | 30 | 15 |
| D | 60 | 45 | 30 | 15 |

This table could have been formed by writing out the various resistance paths as done in Table II and forming the matrix therefrom.

The compensation for the two-wire 4 × 4 matrix described is thus in terms of additional resistance units as follows. Each path will have a $x + y + c + (60/4)x$ resistance. In order to accomplish this, the values added to the various input and outputs as derived from Tables III – VII are:

TABLE VIII

| | | | |
|---|---|---|---|
| 1 | 45 (*x*/4) | 1' | 0 |
| 2 | 30 (*x*/4) | 2' | 15 (*x*/4) |
| 3 | 15 (*x*/4) | 3' | 30 (*x*/4) |
| 4 | 0 | 4' | 45 (*x*/4) |
| A' | 15 (*x*/4) | A | 15 (*x*/4) |
| B' | 15 (*x*/4) | B | 15 (*x*/4) |
| C' | 0 | C | 0 |
| D' | 0 | D | 0 |

The addition of these resistances is shown in FIG. 8. The amount of resistance to be added according to Table VIII is controlled by the value of $x$. The value of $x$ for convenience in metal patterning is given in terms of "squares" of resistance. In general a square of resistance is given in the formula $R\,\square = \rho/d$ where $\rho$ is the sheet restivity of the metal layer and $d$ is the thickness of this layer. For a gold layer one $R$ □ unit is approximately 0.012 ohms for 20,000 A thickness. $x$ is the resistance of the path shown in FIG. 6 and is made, for convenience, to be 20 or 0.24 ohms. This choice is dictated by physical limitation of the chip and the use of gold.

If $x$ is 20 □ at 0.012 Ω/ □ then $x = 0.24$ Ω. Thus the compensation as indicated by Table VIII would be for example at the input 1:

$$45\ (x/4) = 45/4\ (0.24\ \Omega) \cong 2.70\ \Omega.$$

Figure 9:
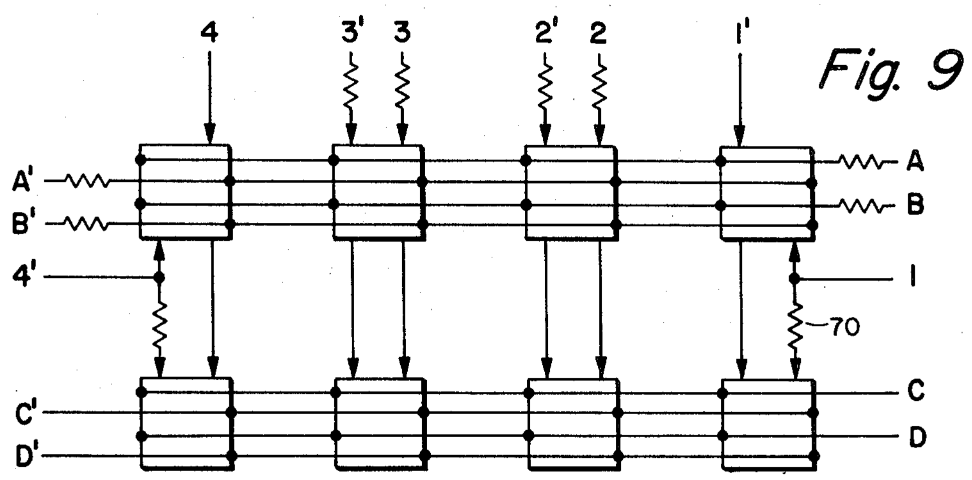
FIG. 9 is a two-wire 4 × 4 network indicating additional path lengths for a different type of pin-out such as that indicated by the package shown in FIG. 1.

Because of the particular "pin-out" (placement of output pins) shown in FIG. 1, a slightly different physical structure is needed. The schematic diagram for this structure is shown in FIG. 9. Before proceeding with a description of FIG. 9 it should be noted that what has been described is a system which can be compensated to zero resistance spread. This is possible because it is possible to add resistances to the various transmission paths without increasing the resistance of any path past the highest resistance path of the uncompensated network. There are moreover a large group of switching networks which can be compensated to "zero" of which the first example is only one.

However due to certain pin-out restrictions it may not always be possible to compensate the switching network to "zero." However, by use of the above technique any M × N switching circuit resistance spread can be minimized.

Assuming the initial conditions of the first example, what has been done in FIG. 1 as can be seen from FIG. 9 is to add an extra "$e$" resistance to some of the transmission paths and to provide parallel connections to the chips for the 1 and 4' inputs. In this case it is assumed that $e = x + z + b/2$, $b = x$ and $z = x/2$. The following table lists all the possible paths through the network shown in FIG. 9. The asterisks denote the highest uncompensated resistance paths.

TABLE IX

| Path | Resistance | Resistance |
|---|---|---|
| 1-A' | $b+z+y+c+4e+3g$ | $x+y+c+59x/8$ |
| 1-B' | $b+z+c+4e+3g$ | $x+y+c + 51x/8$ |
| 1-C' | $x+y+c+4e+3g$ | $x+y+c + 55x\ /8$ |
| 1-D' | $x+y+c+4e+3g$ | $x+y+c + 55x/8$ |
| 1'-A | $x+y+c+e$ | $x+y+c + 10x/8$ |
| 1'-B | $x+y+c+e$ | $x+y+c + 10x/8$ |
| 1'-C | $x+z+b+d+x+y+c+e$ | $x+y+c + 35x/8$ |
| 1'-D | $x+z+b+d+x+y+c+e$ | $x+y+c + 35x/8$ |
| 2-A' | $x+y+c+3e+2g$ | $x+y+c + 40x/8$ |
| 2-B' | $x+y+c+3e+2g$ | $x+y+c + 40x/8$ |
| 2-C' | $x+z+b+d+x+y+c+3e+2g$ | x+y+c + 65$x$/8* |
| 2-D' | $x+z+b+d+x+y+c+3e+2g$ | $x+y+c + 65x/8$* |
| 2'-A | $x+y+c+2e+g$ | $x+y+c + 25x/8$ |
| 2'-B | $x+y+c+2e+g$ | $x+y+c + 25x/8$ |
| 2'-C | $x+z+b+d+x+y+c+2e+g$ | $x+y+c + 50x/8$ |
| 2'-D | $x+z+b+d+x+y+c+2e+g$ | $x+y+c + 50x/8$ |
| 3-A' | $x+y+c+2e+g$ | $x+y+c + 25x/8$ |
| 3-B' | $x+y+c+2e+g$ | $x+y+c + 25x/\ 8$ |
| 3-C' | $x+z+b+d+x+y+c+2e+g$ | $x+y+c + 50x/8$ |
| 3-D' | $x+z+b+d+x+y+c+2e+g$ | $x+y+c + 50x/8$ |
| 3'-A | $x+y+c+3e+2g$ | $x+y+c + 40x/8$ |
| 3'-B | $x+y+c+3e+2g$ | $x+y+c + 40x/8$ |
| 3'-C | $X+z+b+d+x+y+c+3e+2g$ | $x+y+c + 65x/8$* |
| 3'-D | $x+z+b+d+x+y+c+3e+2g$ | $x+y+c + 65x/8$* |
| 4-A' | $x+y+c+e$ | $x+y+c + 10x/\ 8$ |
| 4-B' | $x+y+c+e$ | $x+y+c + 10x/8$ |
| 4-C' | $x+z+b+d+x+y+c+e$ | $x+y+c + 35x/8$ |
| 4-D' | $x+z+b+d+x+y+c+e$ | $x+y+c + 35x/8$ |
| 4'-A | $b+z+y+c+4e+3g$ | $x+y+c + 59x/8$ |
| 4'-B | $b+a+c+4e+3g$ | $x+y+c + 51x/8$ |
| 4'-C | $x+y+c+4e+3g$ | $x+y+c + 55x/8$ |
| 4'-D | $x+y+c+4e+3g$ | $x+y+c + 55x/8$ |

Dividing through by $x/8$, the following matrix is produced for one-half of the switching network.

TABLE X

| | 4 | 3 | 2 | 1 |
|---|---|---|---|---|
| A' | 10 | 25 | 40 | 59 |
| B' | 10 | 25 | 40 | 51 |
| C' | 35 | 50 | 65 | 55 |
| D' | 35 | 50 | 65 | 55 |

Here the highest resistance is 65. The next highest is 59, so six resistance units are added to column 1. Because of the particular configuration of input 1, it is possible to add four resistance units only to 1-C' and 1-D' by the resistor 70 in FIG. 9.

The matrix then becomes:

TABLE XI

| | 4 | 3 | 2 | 1 |
|---|---|---|---|---|
| A' | 10 | 25 | 40 | 65 |
| B' | 10 | 25 | 40 | 57 |
| C' | 35 | 50 | 65 | 65 |
| D' | 35 | 50 | 65 | 65 |

The next highest resistance path is 1-B' at 57, so eight resistance units are added to row B' to yield:

TABLE XII

| | 4 | 3 | 2 | 1 |
|---|---|---|---|---|
| A' | 10 | 25 | 40 | 65 |
| B' | 18 | 33 | 48 | 65 |
| C' | 35 | 50 | 65 | 65 |
| D' | 35 | 50 | 65 | 65 |

The next highest paths have resistance values of 50, so 15 resistance units are added to column 3 to yield:

TABLE XIII

| | 4 | 3 | 2 | 1 |
|---|---|---|---|---|
| A' | 10 | 40 | 40 | 65 |
| B' | 18 | 48 | 48 | 65 |
| C' | 35 | 65 | 65 | 65 |
| D' | 35 | 65 | 65 | 65 |

Although the next highest resistance is 48, nothing can be added to rows or columns containing this number because it would raise other path lengths above 65. The only column which now can be raised is column 4. By adding 30 resistance units to column 4 the matrix yields:

TABLE XIV

| | 4 | 3 | 2 | 1 |
|---|---|---|---|---|
| A' | 40 | 40 | 40 | 65 |
| B' | 48 | 48 | 48 | 65 |
| C' | 65 | 65 | 65 | 65 |
| D' | 65 | 65 | 65 | 65 |

Now there is an impasse because there cannot be added anything to any column or any row which will not raise a path above 65. The resistance spread is now 65 − 40 = 25 resistance units.

However, although zero compensation is not possible, the 25 resistance-unit spread can be minimized as follows. Taking again the next highest value 48, 17 is added to row B' to yield:

TABLE XV

| | 4 | 3 | 2 | 1 |
|---|---|---|---|---|
| A' | 40 | 40 | 40 | 65 |
| B' | 65 | 65 | 65 | 82 |
| C' | 65 | 65 | 65 | 65 |
| D' | 65 | 65 | 65 | 65 |

Then by adding 25 to row A':

TABLE XVI

| | 4 | 3 | 2 | 1 |
|---|---|---|---|---|
| A' | 65 | 65 | 65 | 90 |
| B' | 65 | 65 | 65 | 82 |
| C' | 65 | 65 | 65 | 65 |
| D' | 65 | 65 | 65 | 65 |

Here the spread is also 25. However it will be remembered that six resistance units were added to column 1. What is done is to remove six resistance units from column 1 and add 4 back to resistor 70 such that:

TABLE XVII

| | 4 | 3 | 2 | 1 |
|---|---|---|---|---|
| A' | 65 | 65 | 65 | 84 |
| B' | 65 | 65 | 65 | 76 |
| C' | 65 | 65 | 65 | 65 |
| D' | 65 | 65 | 65 | 65 |

Then adding 11 to resistor 70 and columns 2, 3 and 4 yields:

TABLE XVIII

| | 4 | 3 | 2 | 1 |
|---|---|---|---|---|
| A' | 76 | 76 | 76 | 84 |
| B' | 76 | 76 | 76 | 76 |
| C' | 76 | 76 | 76 | 76 |
| D' | 76 | 76 | 76 | 76 |

Here a spread of eight resistance units is obtained. This is a spread of $8x/8$ or $x$. If $x=20$ □ at 0.012 Ω/□ 18, the resistance spread has been reduced to 0.24 Ω from 2 4 ohms.

The same mirror technique used in the first example can be used to get the second half of the circuit shown in FIG. 9 such that the following resistances are added:

TABLE XIX

| | | | |
|---|---|---|---|
| 1 | see below | 1' | $(11/8)x$ |
| 2 | $(11/8)x$ | 2' | $(26/8)x$ |
| 3 | $(26/8)x$ | 3' | $(11/8)x$ |
| 4 | $(41/8)x$ | 4' | see below |
| A' | $(25/8)x$ | A | $(25/8)x$ |
| B' | $(25/8)x$ | B | $(25/8)x$ |
| C' | see below | C | see below |
| D' | see below | D | see below |

In the 1-C', 1-D' paths $(21/8)x$

In the 4'-C, 4'-D paths $(21/8)x$

Thus by inspection utilizing the above matrix notation and using the "next highest" compensation technique, any M × N switching circuit is compensated to a minimum resistance spread.

Two things have been shown by this method. First is the possibility of reducing metallization-caused resistance spreads to zero for one group of matrixes. Secondly for all M × N matrixes it is possible to reduce resistance spreads by an order of magnitude over uncompensated integrated cicrcuit crosspoint switching circuits. There is also shown apparatus for producing this compensation in the form of particularly configured metallizations both in each chip and in the interconnecting metallization. This provides compensation regardless of the final thickness of the metallization. Finally there is shown a subunit array of crosspoint switching chips which enables rapid conpensation for the entire network.

It will be appreciated that patterning of metallization to achieve varying resistance paths is known in the art and a detailed discussion of this is not included herein.

However it should be apparent that all added resistances are in terms of "squares" of resistance. This allows a very simple method for patterning metal interconnects between a given package pin and a chip pad.

For instance for a unit square $R_\square = \rho/d$. For gold, $\rho = 2.44 \times 10^{-6}$ ohms-cm, $d = 20{,}000$ $A = 2 \times 10^{-4}$ cm. Therefore, $R_\square = 0.012$ ohms. $x$ is chosen to represent a resistance of $20_\square$. Therefore $x=0.24$ ohms. Table VIII indicates that a resistance should be inserted into input path 2. This resistance should have a value of $30x4/4$ ohms. If $x = 20$ □ then the added resistance is 600□/4 = 150 □, or 2.25 ohms.

Now in order to develop 150 □ of resistance (2.25 ohms) between the package pin and input 2, a ratio of L/W of the metallization is made equal to 150. L is the distance between the package pin and input 2, and W is the width of the metallization therebetween. If a straight rectangle of metallization having a thickness of 20,000 A and a $\rho$ of $2.44 \times 10^{-6}$ ohm-cm between pin and pad is not practical, a metallization pattern is devised such that $$\int_{\text{pack pin}}^{\text{pad}} \frac{dL}{W} = 150.$$

Figure 10:
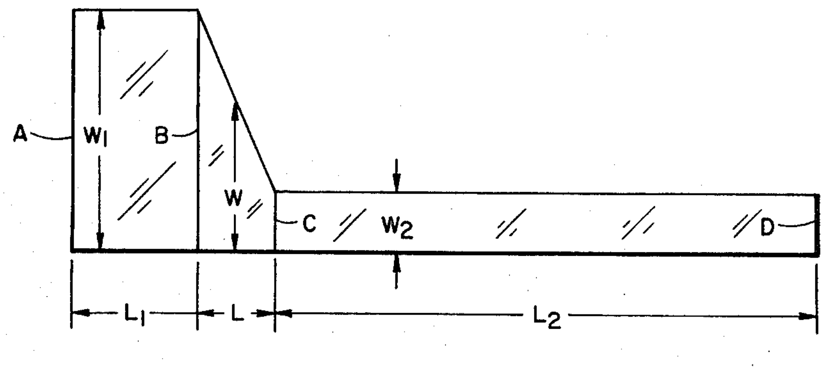
FIG. 10 is a top view of an interconnect metallization piece indicating critical dimensions.

One practical way of making such a metal pattern is shown in FIG. 10. The resistance of 150 must be generated from plane A to plane D. The resistance path $AD = AB + BC + CD$.

$$AB = (L_1/W_1)\,\square$$

$$BC = \int_B^C \frac{dL}{W}\,\square$$

$$CD = (L_2 W_2)$$

If $AD$ is to be 150 □ then one of the many configurations is where $BC$ is made equal to 2 □ and $L_1 = 50\ W_1$ (the drawing is obviously out of scale). If $AB = 50$ □, $CD$ must be 98 □. This is accomplished by making $L_2 = 98\ W_2$.

It can be seen that the number of squares of a rectilinear geometric pattern is merely $L/W$. For all other patterns $\int dL/W$ will yield the number of squares. Thus once knowing the number of squares necessary, a large number of geometries will suffice as long as the individual parts add up to the required number of squares.

What is claimed is:

1. Apparatus for minimizing the resistance spread in a crosspoint switching network employing an array of semiconductor switching elements in a package having package pins by inserting resistances into selected transmission paths through the crosspoint switching network such that all transmission paths through the network from an input package pin to an output package pin have the same resistance comprising:
   metallization for connecting the elements in said array to said package pins, said metallization being patterned so as to provide conducting strips of varying geometric configurations corresponding to different resistances to be inserted between package pins and contacts on said switching elements, the configuration of a particular strip being determined by the resistance required in a particular transmission path between a particular package pin and a particular switching element contact.

2. A method for compensating a crosspoint switching network so as to minimize the resistance spread between transmission paths through said network, said network having switching elements with contact pads, said network being housed in a package having a plurality of contact pads associated with package pins thereof comprising the steps of:
   equalizing the resistances of the various transmission paths in said network by forming metallization strips between selected switching element contact pad and corresponding package pin contact pads, said strips having geometries which produce predetermined resistances between said corresponding paths.

3. The method as recited in claim 2 wherein said metallization strips have equal thicknesses whereby the actual thickness of the equally thick strips makes no difference in the compensation once selected geometries have been ascertained for the strips, the compensation thereby dependent upon the relative geometries and not on the absolute value of the calculated resistances to be added.

4. Apparatus for compensating a switching subunit in a crosspoint switching network, said subunit having at least two semiconductor switching elements in a substrate, so as to minimize resistance spread in the transmission paths through the subunit, each subunit having an input contact pad and a plurality of output contact pads, comprising:
   metallization between said input pad and said switching elements and between said switching elements and corresponding output pads, said metallization being configured so as to decrease the resistance in the path between said input pad and that switching element further therefrom, and so as to decrease the resistance between said further switching element and its corresponding output pad, such that the transmission path resistances for any transmission path between said input pad and any output pad is the same as any other transmission path.

5. The apparatus as recited in claim 4 wherein said metallization is configured by widening it.

6. Apparatus for compensating a switching subunit in a crosspoint switching network, said subunit having at least two semiconductor switching elements in a substrate, so as to minimize resistance spread in the transmission paths through the subunit, each subunit having an input contact pad and a plurality of output contact pads, comprising:
   metallization between said input pad and said switching elements and between said switching elements and corresponding output pads, said metallization being configured so as to increase the resistance in the path between said input pad and that switching element nearest thereto, and so as to increase the resistance between said nearest switching element and its corresponding output pad, such that the transmission path resistances for any transmission path between said input pad and any output pad is the same as any other transmission path.

7. The apparatus as recited in claim 6 wherein said metallization is configured by narrowing it.

8. A transmission path compensated integrated circuit crosspoint switching network of the type in which switching elements are used to connect selected input terminals with selected output terminals and which is interconnected with patterned metallization layers comprising:
   a set of subunits, each subunit containing a predetermined number of said switching elements, subsets of said switching elements sharing a common input and having equal transmission path resistnces between each common input and the outputs of corresponding switching elements in said subset, said path resistnces being made equal by altering the configuration of the metallization from said common input to corresponding switching elements and from said corresponding switching elements to the outputs of these switching elements;
   said subunits being arrayed in a matrix such that a selected common input is connected through one or more of said subunits to a selected output by selective activation of various of said switching elements, said subunits being interconnected by metallization which is patterned so as to provide selected resistances between selected inputs to selected subunits and corresponding input terminals therefor and so as to provide selected resistances between selected outputs of selected subunits and corresponding output terminals therefor, said resistances being added into selected transmission paths through said matrix so as to minimize transmission path resistance differences therethrough, the values of the added resistances being selected so as to raise all of the transmission path resistances through said matrix to the resistance of the path having the greatest uncompensated resistance without raising any path over this greatest uncompensated resistance.

9. The method as recited in claim 2 wherein said predetermined resitances are selected so as to make the difference between the path resistances through said network minimum by ascertaining a maximum uncompensated path resistance, comprising the steps of:

raising all other path resistances to said maximum uncompensated resistances which do not result in any path resistance exceeding said maximum resistance, raising those paths having the next highest path resistance to said maximum resistance; and subtracting from selected paths now over said maximum an amount sufficient to bring their resistances down to said maximum.

10. The method as recited in claim 9 wherein the selection of said predetermined resistances includes repeating the steps of claim 9 until a minimum resistance spread is achieved.

11. The crosspoint switching network as recited in claim 8 wherein a number of subunits are arrayed in M rows of N subunits each, each subunit having two common inputs and two pairs of outputs with each pair being associated with a different one of said common inputs, the inputs to the top row of said units being designated 1, 1′, 2, 2′, 3, 3′ and 4, 4′ . . . *n, n′* respectively with the inputs to the remaining rows of subunits being coupled through a vertically adjacent subunit to a vertically corresponding input via a vertically corresponding subunit in said top row, horizontally corresponding outputs of subunits in each of said rows being interconnected in a predetermined direction such that a set of outputs designated A, B, C, D . . . 2M formed to one side of said array, while a second set of outputs designated A′, B′, C′, D′ . . . 2M′ are formed to a diametrically opposite side of said array whereby a two-wire M × N crosspoint switching array is formed.

12. The crosspoint switching array as recited in claim

11 wherein $M = 2$ and $N = 4$ and wherein the relative resistances added to paths through said network between a terminal and a corresponding subunit contact in order to minimize said resistance spread are given by the following list of relative resistances:

| | | | |
|---|---|---|---|
| 1 | 45 | 1′ | 0 |
| 2 | 30 | 2′ | 15 |
| 3 | 15 | 3′ | 30 |
| 4 | 0 | 4′ | 45 |
| A′ | 15 | A | 15 |
| B′ | 15 | B | 15 |
| C′ | 0 | C | 0 |
| D′ | 0 | D | 0 |

13. The crosspoint switching array as recited in claim 11 wherein $M = 2$ and $N = 4$ and wherein the relative resistances added to paths through said network between a terminal and a corresponding subunit contact in order to minimize said resistance spread are given by the following list of relative resistances:

| | | | |
|---|---|---|---|
| 1 | see below | 1′ | 11 |
| 2 | 11 | 2′ | 26 |
| 3 | 26 | 3′ | 11 |
| 4 | 41 | 4′ | see below |
| A′ | 25 | A | 25 |
| B′ | 25 | B | 25 |
| C′ | see below | C | see below |
| D′ | see below | D | see below |

| Path | | |
|---|---|---|
| 1 | C′ | 21 |
| 1 | D′ | 21 |
| 4′ | C | 21 |
| 4′ | D | 21 |

* * * * *